United States Patent [19]

Weidler

[11] 4,352,382
[45] * Oct. 5, 1982

[54] TIRE PROTECTION CHAIN

[75] Inventor: Erhard A. Weidler, Aalen-Unterkochen, Fed. Rep. of Germany

[73] Assignee: RUD-Kettenfabrik Rieger & Dietz GmbH u. Co., Aalen, Fed. Rep. of Germany

[ * ] Notice: The portion of the term of this patent subsequent to Mar. 19, 1998, has been disclaimed.

[21] Appl. No.: 169,435

[22] Filed: Jul. 16, 1980

[30] Foreign Application Priority Data

Jul. 26, 1979 [CH] Switzerland .......................... 6907/79

[51] Int. Cl.³ .............................................. B60C 27/00
[52] U.S. Cl. .................................. 152/189; 24/68 TT; 24/69 TT; 24/299; 59/93; 152/191; 152/225 R; 152/242; 152/244; 248/548; 403/2
[58] Field of Search ................. 152/172, 177, 178, 179, 152/180, 182, 184, 187, 189, 191, 225 R, 170, 223, 241–244; 403/2; 248/548, 549; 59/93, 78, 84; 24/68 TT, 68 R, 68 BT, 69 TT, 73 AC, 73 CE

[56] References Cited

U.S. PATENT DOCUMENTS

| 828,641 | 8/1906 | Clifford | 152/178 |
|---|---|---|---|
| 1,459,091 | 6/1923 | Dougherty | 59/78 UX |
| 1,631,346 | 6/1927 | Swoope | 59/84 |
| 2,421,789 | 6/1947 | Ingham | 59/84 |
| 3,922,104 | 11/1925 | McCullough | 403/2 |
| 3,995,598 | 12/1976 | Gardner et al. | 59/93 X |
| 4,135,564 | 1/1979 | Müller et al. | 152/182 |
| 4,267,871 | 5/1981 | Weidler | 152/189 |

Primary Examiner—Edward C. Kimlin
Assistant Examiner—Thomas Bokan
Attorney, Agent, or Firm—Parmelee, Johnson, Bollinger & Bramblett

[57] ABSTRACT

In a tire protection chain with plate-shaped components (1) which cover the tread of the tire to be protected, and with at least one chain network (4) located on one side of the tire, the chain network is provided with overload safeguards (7, 8, 9, 14, 18, 22) which form a parting position when the chain network is subjected to extremely high loadings. The overload safeguards are here designed in such a way that no parts can be released and thrown off when the chain network is overloaded.

8 Claims, 6 Drawing Figures

TIRE PROTECTION CHAIN

BACKGROUND OF THE INVENTION

The invention relates to a tire protection chain with plate-shaped components which cover the tread of the tire to be protected and are connected, at least at their ends located on the outside of the tire, to a chain network covering the side wall of the tire.

In a known tire protection chain of the above type (German Auslegeschrift No. 2,310,945), eyes formed by lugs are used for fixing the chain network to the plate-shaped components, the eyes being welded to the underside of the components. The strength of these eyes is equal to or greater than the strength of the chain members of the chain network.

It has been found that tires, equipped with tire protection chains of the type under consideration, can explosively burst under extreme conditions, for example if there is a fault in the material or due to overloading or fatigue. In unfavorable cases, loadings of such a magnitude then occur that individual chain members fracture, are released from the chain and are thrown off. Thus, not only the chain network is damaged, but there is also a risk of injury to persons or of damage to property due to parts flying off.

SUMMARY OF THE INVENTION

It is the object of the invention to design a tire protection chain, of the type described at the outset, in such a way that, when the chain is overloaded due to explosive destruction of the tire, individual parts of the chain network, which have broken off or broken out, are prevented from flying off.

According to the invention, this object is achieved when the chain network is provided with a number of overload safeguards which are located at points intended for horizontal or vertical members and form a parting seam which, when the chain network is overloaded, opens without fragments being released, before the ultimate strength of the chain members is reached.

The tire protection chain according to the invention has the advantage that, under extreme loadings of the type under discussion, the parting seam in the chain opens without chain members fracturing in such a way that fragments are released which can cause damage. In other words, the tire protection chain according to the invention is provided with a seam which is intended to break and which makes it possible to control events in the desired sense in the case of overloading by a bursting tire.

BRIEF DESCRIPTION OF THE DRAWINGS

In the following text, the invention is explained in more detail by reference to the attached drawings in which.

DESCRIPTION OF THE PREFERRED EMBODIMENTS

Figure 1:
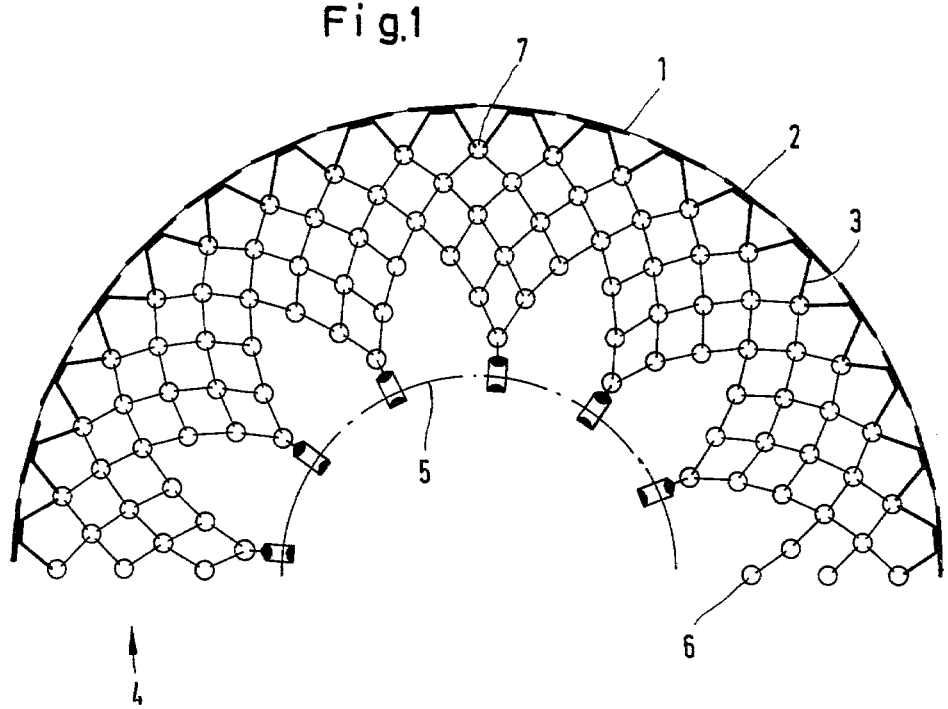
FIG. 1 shows a partial side view of a first tire protection chain.

In FIG. 1, plates serving to cover the tread of a tire are marked 1 and their ends are provided with lugs 2 into which vertical members 3 are hooked, which form part of a chain network 4 which is fitted between the plates 1 and a side chain 5. The chain network consists of oval or bridge-shaped vertical members 3 and horizontal members 6 in the form of circular rings. 7 marks overload safeguards which take the place of normal horizontal members 6 and are arranged in the form of circular rings. The overload safeguards 7 become effective when the cabin network is overloaded, specifically in such a way that the chain network can tear open in the zone of the overload safeguards 7, without any fragments being released.

Figure 2:
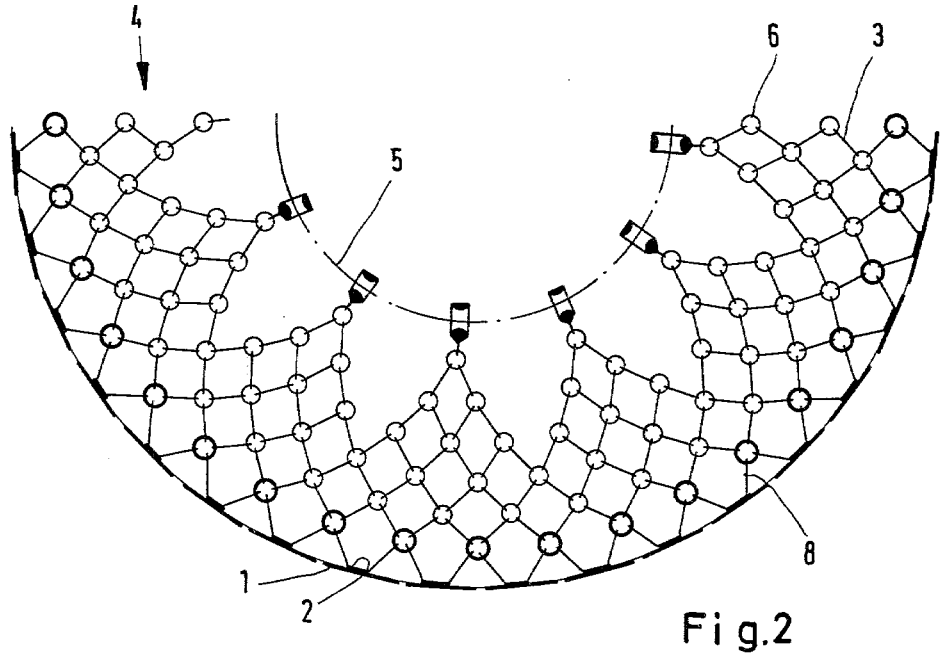
FIG. 2 shows a partial side view of a second tire protection chain.

FIG. 2 shows a side view of a tire protection chain having the same basic structure as the tire protection chain according to FIG. 1. The same reference numerals are therefore used for mutually corresponding parts. Whilst, in the embodiment described first, overload safeguards are provided in positions normally taken up by horizontal members, overload safeguards 8, which replace vertical members, are used in the second embodiment. The overload safeguards 8 in the second embodiment also form a ring which opens without fragments being released.

Preferred illustrative embodiments of overload safeguards are shown in FIGS. 3–6.

Figure 3:
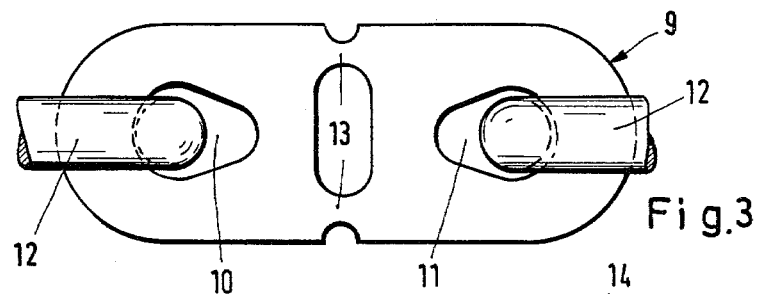
FIG. 3 shows, on an enlarged scale, an individual first overload safeguard.

FIG. 3 shows an overload safeguard 9 which can be inserted especially in place of a vertical member and which has two closed eyes 10 and 11 which each serve to receive one chain member 12 and which are connected to one another via a bridge 13 which is intended to break.

An overload safeguard 14 with two closed eyes 15 and 16 is also represented in FIG. 4, wherein 17 again is a bridge which is intended to break.

Figure 4:
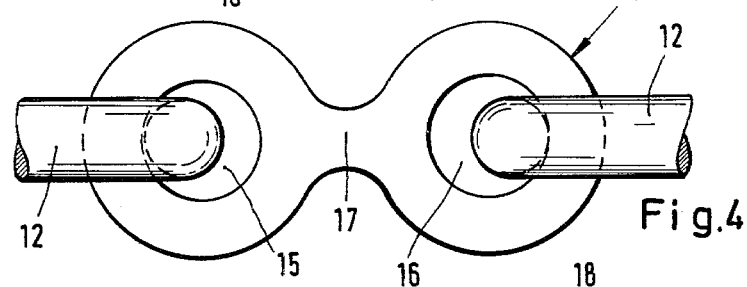
FIG. 4 shows a second overload safeguard.

In the case of overloading of the chain network which is equipped with overload safeguards according to FIGS. 3 and 4, parting of the eyes 10, 11 or 15, 16 connected to the chain members 12 takes place in the zone of the bridge 13 or 14 respectively, which is intended to break. The halves separated by the fracture, however, always remain joined to the chain members 12. The overload safeguards 9 and 14 can be either hardened or hardened and tempered.

Figure 5:
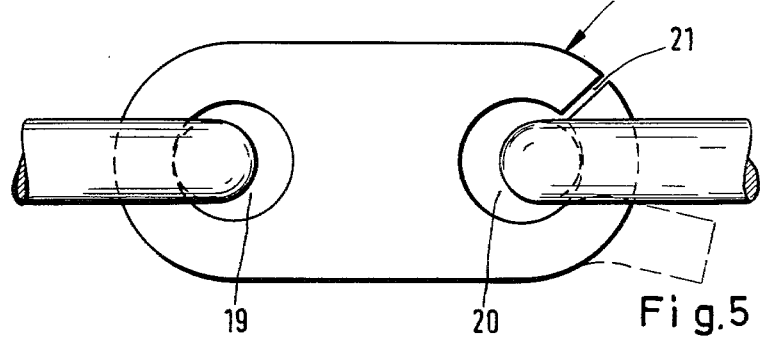
FIG. 5 shows a third overload safeguard.

FIG. 5 shows an overload safeguard 18 which has a closed eye 19 and a slotted eye 20. As indicated in FIG. 5, that part of the eye 20 which is located underneath the slot 21 can bend open and thus move into the position shown in dashes. In other words, the eye 20 is automatically opened due to plastic deformation when the chain network is overloaded. To ensure unhindered deformation, the overload safeguard 18, at least in the deformation zone, must not have a core and surface hardness which exceeds a Vickers pyramid hardness of 450.

Figure 6:
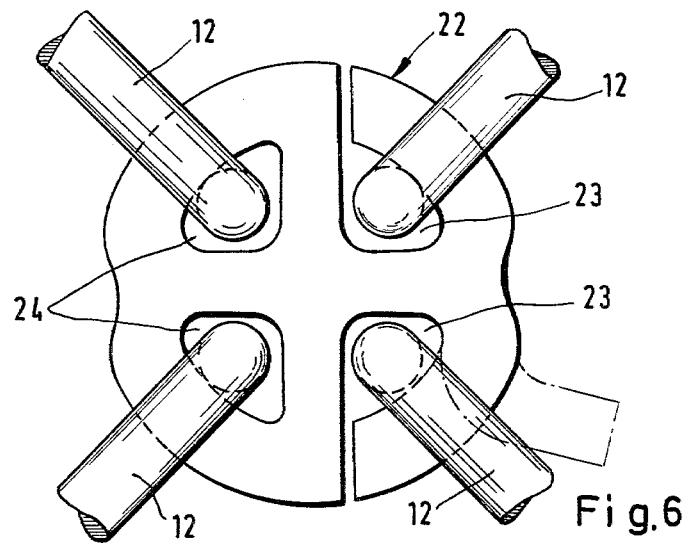
FIG. 6 shows a fourth overload safeguard.

Whilst the overload safeguards according to FIGS. 3–5 are in particular capable of fulfilling the task of the overload safeguards 8 in FIG. 2, the overload safeguard according to FIG. 6 is preferentially suitable for installation in a horizontal position, that is to say for installation in place of the overload safeguards 7 in FIG. 1. The overload element 22 in FIG. 6 has two slotted eyes 23 and two closed eyes 24, one vertical member 12 being hooked into each of these. When the chain network is overloaded, only one eye bends open as a rule.

I claim:

1. A tire protection chain with plate-shaped components which cover the tread of the tire to be protected and are connected, at least at their ends located on the outside of the tire, to a chain network including horizontal and vertical chain links covering the sidewall of the tire, the chain network (4) being provided with a number of overload safeguards (7, 8, 9, 14, 18, 22) which are located at points intended for some of the horizontal or vertical chain links and form a parting seam which, when the chain network is overloaded, opens without fragments being released, before the ultimate strength of the horizontal or vertical chain links (3,6) is reached.

2. A chain as claimed in claim 1, wherein the overload safeguards (7,8) are located proximate the outer periphery of the chain network (4).

3. A chain as claimed in claim 2, wherein the overload safeguards (8) connect the chain network (4) to the plate-shaped components (1).

4. A chain as claimed in claim 1 or 2, which comprises overload safeguards (9, 14) which have at least two closed eyes (10, 11, 15, 16), which are each to receive one chain link (12), and in which the eyes (10, 11, 15, 16) are connected to one another via a bridge (13, 17) which is intended to break.

5. A chain as claimed in claim 1 or 2, which comprises overload safeguards (18, 22) which have at least one slotted eye (20, 23) which can be bent open under load and which releases the chain link (12) hooked therein, before the ultimate strength of the chain links of the chain network is reached.

6. A chain as claimed in claim 5, which comprises overload safeguards (18) which each have one slotted eye (20) and one closed eye (19).

7. A chain as claimed in claim 5, which comprises overload safeguards (22) which each have at least two slotted eyes (23).

8. A chain as claimed in claim 5, wherein the part, which can be bent open, of the slotted eye (20,23) has a core and surface hardness which, as a maximum, corresponds to a Vickers pyramid hardness of 450.

* * * * *

UNITED STATES PATENT AND TRADEMARK OFFICE
CERTIFICATE OF CORRECTION

PATENT NO. : 4,352,382
DATED : October 5, 1982
INVENTOR(S) : Erhard A. Weidler

It is certified that error appears in the above—identified patent and that said Letters Patent is hereby corrected as shown below:

On the Title Page, Column 1, of the above patent: Delete "The portion of the term of this patent subsequent to Mar. 19, 1998, has been disclaimed." and substitute:

-- The portion of the term of this patent subsequent to May 19, 1998, has been disclaimed. --

Column 1, Line 12: Delete "2,310,945" and substitute -- 2,310,954 --.

Signed and Sealed this

Fifteenth Day of February 1983

[SEAL]

Attest:

GERALD J. MOSSINGHOFF

Attesting Officer

Commissioner of Patents and Trademarks